United States Patent [19]

Arnone

[11] Patent Number: 4,920,271
[45] Date of Patent: Apr. 24, 1990

[54] MULTIPLE CHANNEL PROGRAMMABLE COINCIDENCE COUNTER

[75] Inventor: Gaetano J. Arnone, Los Alamos, N. Mex.

[73] Assignee: The United States of America as represented by the Department of Energy, Washington, D.C.

[21] Appl. No.: 315,871

[22] Filed: Feb. 27, 1989

[51] Int. Cl.$^5$ .................. G01T 3/00; H01J 47/12; G06M 11/02

[52] U.S. Cl. .................. 250/390.01; 250/390.02; 377/10

[58] Field of Search .............. 377/10; 250/390.01, 250/390.02, 390.03

[56] References Cited

U.S. PATENT DOCUMENTS 4,002,912  1/1977  Stringer ................ 250/390.01 X
4,580,056  4/1986  Kaiser et al. ............. 250/390.01
4,642,466  2/1987  Swansen ................. 250/392

OTHER PUBLICATIONS

G. S. Brunson et al., "Neutron Multiplicity Measurements During LINAC Interrogation of Safeguards Accountable Material", Los Alamos National Laboratory report LA-11340-MS (Jul. 1988).
C. H. Vincent, "A Method of Reducing Dead-Time Errors in Neutron Multiplicity Measurements with Shift Registers", Ministry of Defence, AWRE, Aldermaston, Berkshire, England (Jan. 1986).
M. S. Krick et al., "Neutron Multiplicity and Multiplication Measurements", Nucl. Instrum. and Methods in Phys. Research 219, 384–393 (1984).
James E. Swansen et al., "Shift-Register Coincidence Electronics System for Thermal Neutron Counters", Nucl. Instrum. and Methods 176, 555–565 (1980).

Primary Examiner—Janice A. Howell
Assistant Examiner—J. Eisenberg
Attorney, Agent, or Firm—Milton D. Wyrick; Paul D. Gaetiens; William R. Moser

[57] ABSTRACT

A programmable digital coincidence counter having multiple channels and featuring minimal dead time. Neutron detectors supply electrical pulses to a synchronizing circuit which in turn inputs derandomized pulses to an adding circuit. A random access memory circuit connected as a programmable length shift register receives and shifts the sum of the pulses, and outputs to a serializer. A counter is input by the adding circuit and downcounted by the seralizer, one pulse at a time. The decoded contents of the counter after each decrement is output to scalers.

17 Claims, 3 Drawing Sheets

MULTIPLE CHANNEL PROGRAMMABLE COINCIDENCE COUNTER

BACKGROUND OF THE INVENTION

This invention generally relates to the field of digital processing of the counting of randomly occurring pulses and more specifically, to the field of high speed digital processing of pulses for neutron coincidence counting. This invention is a result of a contract with the Department of Energy (Contract No. W-7405-ENG-36).

Neutron coincidence counting is of importance in both active and passive non-destructive assay (NDA) instrumentation as coincidence is a unique signature of the fission process. High speed analog detectors, along with digital processing and output, is essential to accomplish accurate time-correlation measurements in the nuclear field and for other fields in which rapidly and randomly occurring pulses are to be accurately detected and counted.

Prior art neutron time-correlation, or coincidence, counting circuits have most notably suffered from limited counting speed and accuracy due in large part to excessive dead times, that is, the period during which input pulses are not being processed. In most prior art devices, this dead-time period ranges from approximately 0.7 to 2.4 microseconds. A good review of counting circuits used in the nuclear materials measurement and safeguards fields is made by J. S. Swansen, P. R. Collinsworth, and M. S. Krick in "Shift-Register Coincidence Electronics System for Neutron Counters," Los Alamos National Laboratory Report LA-8319-MS, April 1980.

Some of the previous designs for coincidence counters have OR'D outputs from several neutron detectors and forwarded the OR output to a single shift register. Thus, once a pulse was loaded into the shift register, the unit was unable to accept additional pulses until the existing pulse in the shift register was shifted into the next bin. In the case of a 1 MHz shift clock, this dead time could approach 1 microsecond.

Previous coincidence counting devices have also commonly employed histogramming memory. Histogramming memory has a bandwidth of only approximately 0.9 MHz, and can result in an unacceptable loss of data. This loss is entirely eliminated in the present invention.

The present invention also provides for the programming of several parameters such as shift register length, shift register clock frequency and background read interval. This programming ability allows the present invention to be mated with various neutron detectors.

It is therefore an object of the present invention to provide a high-performance neutron time-correlation counter that minimizes the dead-time of the device.

It is another object of the present invention to provide a high-performance neutron time-correlation counter having improved counting accuracy.

It is a further object of the present invention to provide a high-performance neutron time-correlation counter that may be used with various neutron detectors.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance. With the purposes of the present invention, as embodied and broadly described herein, the apparatus of this invention may comprise a high speed counting circuit for accurate neutron coincidence counting may comprise a high speed counting circuit for accurate neutron coincidence counting comprising neutron detection means for supplying electrical pulses on detection of neutrons; synchronizing means inputted by the neutron detection means for derandomizing and latching the pulses supplied by the neutron detection means; summing means inputted by the synchronizing means for summing the pulses received during a predetermined period of time; shift register means inputted by the summing means for shifting the sum of added pulses; counter means inputted by the summing means for storing the sum of the pulses; serializing means inputted by the shift register means and outputting the contents of the shift register means as a serial stream of pulses for decrementing the sum of the pulses stored in the counter means by one pulse at a time; decoder means inputted by the counter means after each decrement for producing an output indicative of the sum of pulses stored in the counter means after each decrement; scaler means inputted by the decoder means for storing the sum of pulses stored in the counter means after each decrement.

In a further aspect of the present invention and in accordance with it objects and purposes a high speed programmable system for accurate neutron coincidence counting may comprise a plurality of neutron detection means for supplying electrical pulses on detection of neutrons; a plurality of digital processing circuits, one digital processing circuit associated with each one of the plurality of neutron detection means, each of the digital processing circuits inputted by its individually associated neutron detection means for derandomizing and latching the pulses supplied by the neutron detection means; a programmable read only memory circuit programmed as a summer inputted by the plurality of digital processing means for summing the pulses received during a predetermined period of time; shift register means comprising a random access memory inputted by the programmable read only memory circuit for shifting the sum of added pulses; counter means inputted by the programmable read only memory circuit for storing the sum of the pulses; serializing means inputted by the shift register means and outputting the sum of added pulses in the shift register means as a serial stream of pulses for decrementing the sum of the pulses stored in the counter means by one pulse at a time; decoder means inputted by the counter means after each decrement for producing an output indicative of the sum of pulses stored in the counter means after each decrement; scaler means inputted by the decoder means for storing the sum of pulses stored in the counter means after each decrement.

BRIEF DESCRIPTION OF THE DRAWINGS

The accompanying drawings, which are incorporated into and form a part of the specification, illustrate an embodiment of the present invention and, together with the description, serve to explain the principles of the invention. In the drawings.

DETAILED DESCRIPTION OF THE PREFERRED EMBODIMENT

Figure 1:
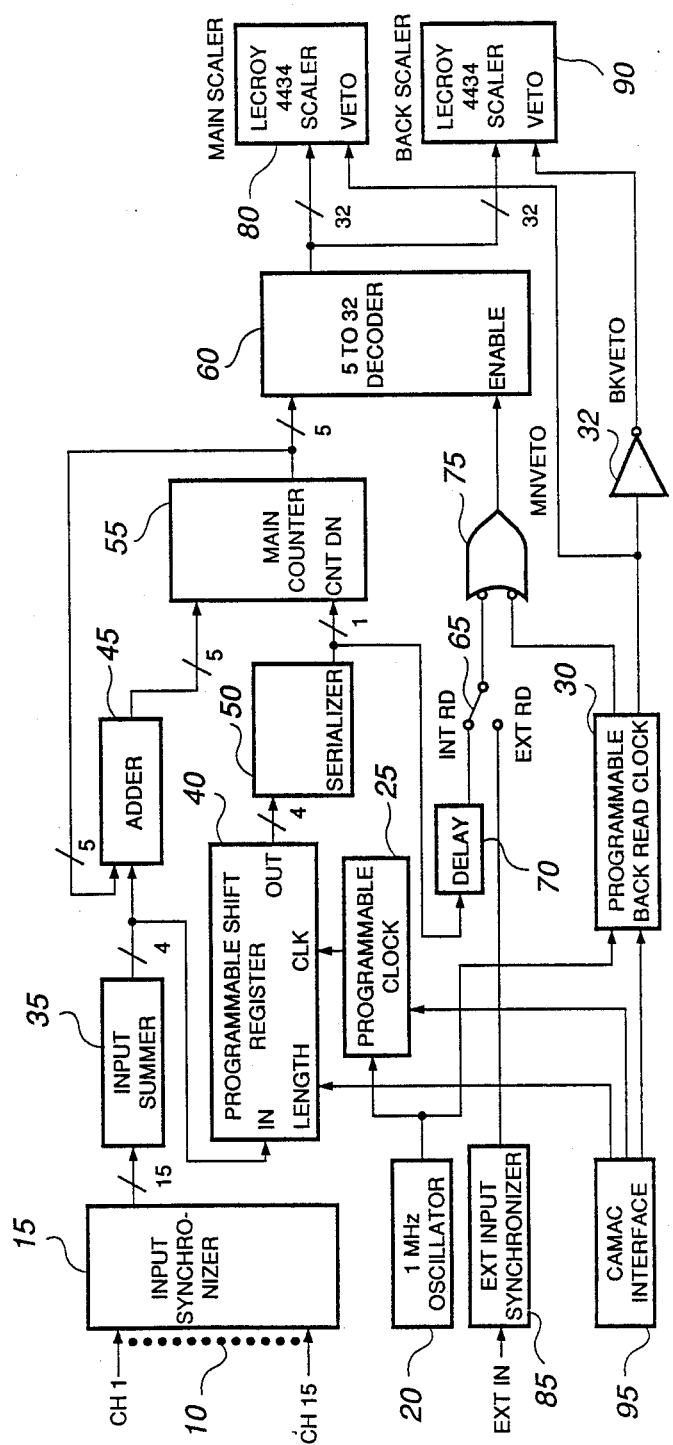
FIG. 1 is a block diagram of the present invention.

The present invention relates to time-correlated event counting particularly as it relates to highly accurate coincidence counting of neutrons. Referring now to FIG. 1, wherein there is illustrated a block diagram of the present invention, where outputs from neutron detectors 10 are shown as inputs to channels 1-15 of input synchronizer 15. Only one pulse per channel can be processed during a time period. As pulses are likely to be numerous and to occur in a random fashion synchronizer 15 serves to latch pulses that occur on any of the 15 inputs on the negative edge of the pulses and generates a chain of synchronized, or derandomized, spaced apart pulses. The overall timing system for the invention is controlled by crystal oscillator 20, which operates at a nominal frequency of 1 MHz and drives programmable clock 25, and programmable background read clock 30. Clock 25 generates the clock signal for programmable shift register 40 and can be programmed to run at 2 MHz, 1 MHz, 500 KHz or 250 KHz. These frequencies correspond to a clock period of 500 ns, 1 microsecond, 2 microseconds, or 4 microseconds. The present invention is a synchronous design where all timing derives from crystal oscillator 20. Even asynchronous input signals are synchronized with programmable clock 25 or programmable background read clock 30.

Input summer 35 receives the output of synchronizer 15, and sums the total number of pulses hitting channels 1-15 of synchronizer 15 during a current clock period, and produces a 4-bit binary value from 0-15. In one embodiment, input summer comprises a programmable read only memory circuit programmed as a summer. The output of summer 35 is sent to programmable shift register 40 and to adder 45 for input to main counter 55. Programmable shift register 40 is used to shift the number of hits received during each clock period. The length of shift register 40 is programmable within the range of 1-1024 bins. The bin time of shift register 40 depends upon the setting of programmable clock 25 ranging from 500 ns to 4 microseconds. Adder 45 accepts the total hits for a particular time period from summer 35 and adds it to the current value in main counter 55.

Main counter 55 receives hits through adder 45 as they are shifted into shift register 40, and stores the total number of hits contained in shift register 40. As hit values are shifted out of shift register 40, they are serialized by serializer 50. This serial stream down counts or subtracts from the value contained in main counter 55, one pulse at a time. After each decrement, the value remaining in main counter 55 is output to decoder 60. The maximum count value that can be contained within main counter 55 is 255 however only values of 0-31 are encoded and underflow or overflow errors are produced by conventional circuitry (not shown) if the included sums exceed these values.

The output of main counter 55 after each decrement from serializer 50 is connected to decoder 60 which serves to decode the value contained within main counter 55 and to output a pulse to the appropriate scaler signal line to main scaler module 80 or back scaler module 90. Main scaler module 80 and back scaler module 90 are 32 channel external scalers and may be Lecroy Model 4434 scalers. Main scaler module 80 and back scaler module 90 bits deep. Within scaler nodules 80, 90, all scalers are controlled by a single VETO signal.

The setting of switch 65 determines the manner in which the value contained within main counter 55 is to be sent to main scaler module 80. When switch 65 is in the internal (upper) position the read out of main counter 55 is accomplished each time a down count is outputted from serializer 50. This down count decrements main counter 55 first, and after a built in propagation delay, enables decoder 60, sending a pulse to the channel of main scaler module 80 which corresponds to the value contained in main counter 55.

Back read clock 30 controls the synchronization of the background read circuitry. The background circuitry of the present invention is used to statistically determine which neutron events are related and which are random. The reading of main counter 55 is done at a predetermined interval which may be 8 microseconds, 32 microseconds, 128 microseconds 512 microseconds 2.048 ms, 8.192 ms, 32.768 ms, 131.072 ms, 524.288 ms. 2.079 sec 8.388 sec 33.554 sec 134.217 sec, 536.87 sec, or 2147.48 sec. The output of decoder 60 is also provided to back scaler 90. The intent behind the background read is that it is accomplished independently. That is, it is accomplished at a timing rate which bears no direct relationship to the rate at which neutron pulses are admitted.

CAMAC interface 95 is a conventional computer aided measurement control interface used to interface the invention to a CAMAC bus (not shown) in order to provide software control of the invention for programming the invention and reading its status. The features which interface 95 allows to be controlled are the programming of the length of shift register 40, of the frequency of programmable clock 25, and of the frequency of back read clock 30; enabling and disabling inputs 10; and resetting components such as main counter 55, and shift register 40.

In operation, after a pulse or a packet of pulses from inputs 10 is synchronized by input synchronizer 15, summed by input summer 35, and shifted out of shift register 40 by way of serializer 50, main counter 55 will be decremented by one for each pulse, and thereafter a pulse will be sent to main scaler 80. The channel on which the pulse will be received by main scaler 80 corresponds to the value in main counter 55 after it has been decremented by serializer 50. For example, if main counter 55 contains a value of 1 at the beginning of a cycle of serializer 50, and a single down count is received from shift register 40 through serializer 50, then main counter 55 is first decremented to 0. Afterwards, a pulse is sent out the channel zero line of decoder 60 to channel zero of main scaler 80. It should be noted, however, when using the Lecroy 4434 scaler module, that channel one of main scaler 80 corresponds to channel zero of decoder 60.

As a further example, in one embodiment the maximum number of counts during a cycle of programmable clock 25 is 15 as that is the number of detector 10 inputs into input synchronizer 15. This means that the largest packet of downcounts from serializer 50 that can occur in a clock cycle is also 15. Assuming that the value contained in main counter 55 is 15, and that the down count packet is equal to 15, the first action is that main counter 55 is decremented by 1 and a pulse is sent out channel 14 to main scaler 80. Next, main counter 55 is again decremented by 1, and a pulse is sent out the channel 13 line. This process continues until main counter 55 is decremented to zero and a pulse sent out the zero line. At this point, main counter 55 is ready to receive the number of input channel hits from detectors 10 during the next cycle of clock 25 which, as stated above, can be a number between 0 and 15.

As the current packet of hits arrives during a cycle of clock 25, it is placed into shift register 40, and as each pulse is shifted out will individually down count main counter 55. The time necessary for the packet of pulses to traverse shift register 40 is the product of the clock period of shift register 40 and the number of bins of shift register 40 which are being used, both of which are programmable according to the invention. This time can range from 500 ns for a clock period from programmable clock 25 of 500 ns and a length of shift register 40 of 1, to a maximum of 4.096 ms for a clock period of 4 microseconds and a shift register 40 length of 1024.

The value contained in main counter 55 is also provided during background read times. A background read time is the programmable sub-multiple of the frequency of programmable clock 25. During these periods, the value in main counter 55 is sent out to background scaler 90. The background read occurs after both the down count and add portions are completed. As an example, assume that after the down count and add portions of a clock cycle are completed, main counter 55 contains the value of 12. Main scaler 80 is then disabled during back read by the output of programmable back read clock 30, which simultaneously enables back scaler 90 through inverter 32. At this time, a pulse will be sent out the channel 12 signal line to back scaler 90.

Switch 65 has two positions. One is the internal read function which has been heretofore described. The other is the external read function. In this position, operation of the invention is very similar to the internal read function except that instead of the down count pulses generating the pulses sent to main scaler 80, an external read pulse provided through external input synchronizer 85 generates the pulse sent to main scaler 80. All other functions remain unchanged.

When a pulse is detected during a clock cycle, and switch 65 is in the external read function, the pulse is latched, and used to enable a main read once during the cycle. This read occurs after the down count and add portions of the cycle. If an external read pulse is presented at this time the value in main counter 55 will be sent out the appropriate line (channel 1 to 15) to main scaler 80. For example, if main counter 55 contains the value of 10 after the down count and add cycles are completed, and an external read pulse is detected, a pulse will be sent out the channel 10 signal line to main scaler 80. It is important to note that should an external read pulse be detected during the current cycle, and fail to meet the required set up time, the external read of main counter 55 will be delayed until the next clock period.

Figure 2:
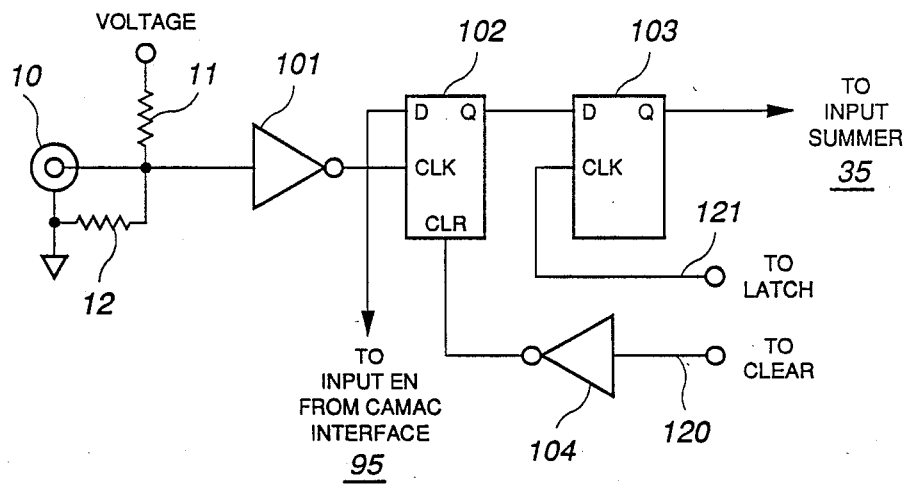
FIG. 2 is a schematic drawing of the input synchronizer circuit of the present invention.

In the above described embodiment, most components are well known to those skilled in the art. A few, however, involve unique configurations of components that require discussion. The first of these circuits is shown in FIG. 2 which represents one input section of input synchronizer 15. As shown one input 10 is biased by resistors 11 12 and is connected to the input of inverter 101. The output of inverter 101 is provided to the clock input of circuit 102. Output Q of circuit 102 is connected to the D input of circuit 103. The D input of circuit 102 (input en) is provided from CAMAC interface 95 (FIG. 1) and enables input 10. The CLR input of circuit 102 is CLEAR signal 120 which is produced by delay line 112 (FIG. 3 below) inverted by inverter 104.

Circuit 103 has its clock input fed by LATCH signal 121 from delay line 112, and its Q output is connected to input summer 35 (FIG. 1). In one embodiment the present invention utilizes fifteen (15) of the circuits, illustrated schematically in FIG. 2, to synchronize or derandomize the random hits on detectors 10 during each clock period, and to provide the synchronized hits to input summer 35 (FIG. 1). The use of individual circuits in input synchronizer 15, one for each neutron detector input 10, is the primary method of the present invention for decreasing system dead time.

Figure 3:
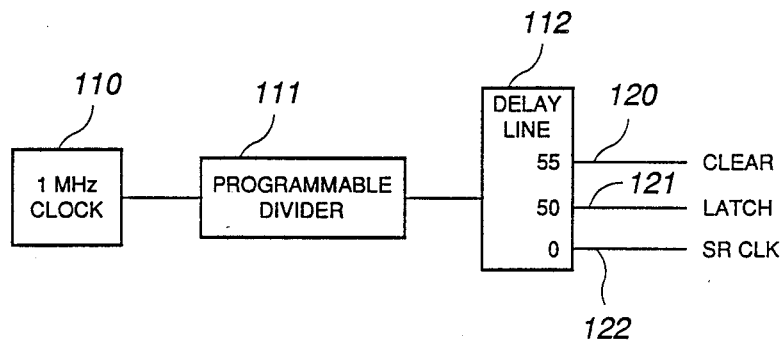
FIG. 3 is a block diagram of the programmable clock circuit of the present invention.

Another circuit which deserves analysis is programmable clock 25. Greater detail of this circuit is schematically illustrated in FIG. 3, wherein the output of 1 MHz clock 110 is connected to programmable divider 111. programmable divider 111 is capable of dividing the 1 MHz output of clock 110 into intervals which range from a low of 500 ns to a maximum of 4 microseconds. The output of programmable divider 111 is connected to delay line 112 whose outputs, CLEAR signal 120. LATCH signal 121 and SR CLK signal 122 are illustrated at the 55 ns, 50 ns, and 0 outputs respectively.

Figure 4:
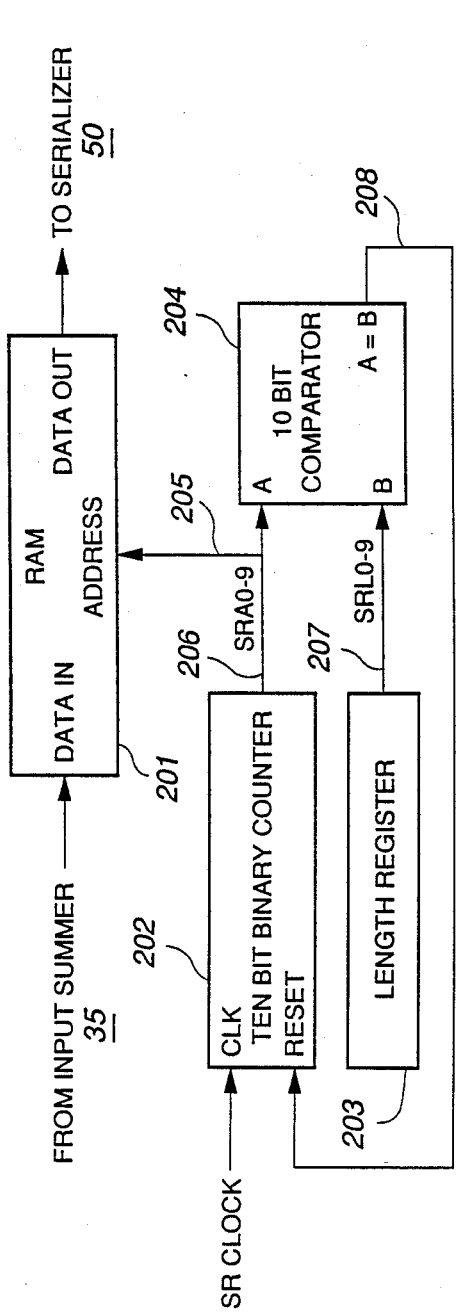
FIG. 4 is a block diagram of the programmable shift register of the present invention.

Possibly the most important subcircuit, that of programmable shift register 40 is illustrated as a block diagram in FIG. 4. Here the output of input summer 35 (FIG. 1) is input to Random Access Memory (RAM) 201. In this embodiment, RAM 201 is a 1024 by 4 high speed (25 ns) access RAM. The data output is provided to serializer 50 (FIG. 1) for downcounting main counter 55 (FIG. 1).

RAM 201 has address lines 205 which are driven by binary counter circuit 202. Counter circuit 202 is clocked by SR CLK signal 122 from delay line 112 (FIG. 3). The outputs of counter circuit 202 are also driving 5 comparator circuit 204, which serves to compare the output of counter circuit 202, being the SRA 0-9 signals on line 206, with the SRL 0-9 length signals on line 207. The length signals contained within length register 203 are programmed through CAMAC interface 95 (FIG. 1). When the length signals on line 206 are equal to the length signals on line 207. comparator 204 outputs a signal on line 208 which causes counter circuit 202 to reset on the next clock cycle of SR CLK signal 122. The effect of these functions is that RAM 201 is accessed in a circular, sequential fashion.

At the beginning of each SR CLK signal 122. a read is performed on the currently addressed memory location that is, data is loaded into serializer 50 (FIG. 1). Next a number of pulses equal to the number that was loaded into serializer 50 is output from serializer 50 to downcount the number of pulses residing in main counter 55. After the downcount portion of SR CLK signal 122 is completed, the same address of RAM 201 that was read during the previous clock cycle is now written into with new data. For example assume that programmable shift register 40 is programmed for a length of 100 that the frequency of SR CLK signal 122 is 1 MHz, and that the current address in RAM 201 is 0. After address 0 of RAM 201 is read out into serializer 50 current data will be loaded into address 0, but will not be read out until 100 cycles of SR CLK signal 122 have elapsed. Therefore the current data will be delayed in time for 100 times 1 microsecond, or a total of 100 microseconds.

Figure 5:
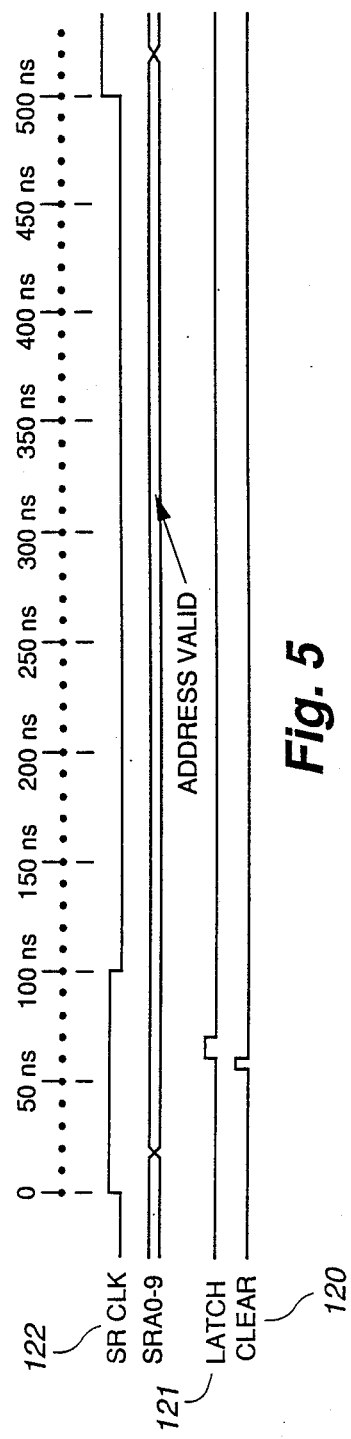
FIG. 5 is a timing diagram of some of the timing pulses used with the present invention.

Refer now to FIG. 5 where there is illustrated a timing diagram of the major timing signals which are described herein, over a 500 ns time period with a 2 MHz clock. As seen. SR CLK signal 122 is high from time 0 time 100 ns. During this period CLEAR signal 120 goes high at time 55 ns and low at 60 ns. LATCH signal 121 goes high at time 60 ns and low at 70 ns. Certain uses of these signals are illustrated in FIGS. 2 and 3. The use of CLEAR signal 120 and LATCH signal 121 in FIG. 2 is instructive of the minimization of dead time throughout the present invention in that propagation delays are utilized for timing purposes. Although CLEAR signal 120 is shown occurring prior to LATCH signal 121 in FIG. 5, in FIG. 2 it is inverted by inverter 104 and arrives at the CLR input of circuit 102 after LATCH signal 121 arrives at the CLK input of circuit 103. This use of propagation delays allows one type of dead time in the present invention to be minimized.

Also shown in FIG. 5 is the timing of the SRA 0-9 signals shown on line 206 in FIG. 4. These are the signals in FIG. 4 which are compared with the programmable signals on line 207 (SRL 0-9) by comparator 204.

The foregoing description of embodiments of the present invention has been presented for purposes of illustration and description. It is not intended to be exhaustive or to limit the invention to the precise form disclosed and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A high speed counting circuit for accurate neutron coincidence counting comprising:
   neutron detection means for supplying electrical pulses on detection of neutrons;
   synchronizing means inputted by said neutron detection means for derandomizing and latching said pulses supplied by said neutron detection means:
   summing means inputted by said synchronizing means for summing said pulses received during a predetermined period of time;
   shift register means inputted by said summing means for shifting said sum of added pulses;
   counter means inputted by said summing means for storing said sum of said pulses;
   serializing means inputted by said shift register means and outputting the contents of said shift register means as a serial stream of pulses for decrementing said sum of said pulses stored in said counter means by one pulse at a time;
   decoder means inputted by said counter means after each decrement for producing an output indicative of said sum of pulses stored in said counter means after each decrement;
   first scaler means inputted by said decoder means for storing said sum of pulses stored in said counter means after each decrement.

2. The high speed counting circuit as described in claim 1 wherein said neutron detection means comprises up to fifteen neutron detectors.

3. The high speed counting circuit as described in claim 1, further comprising first programmable clock means for providing overall timing pulses to said high speed counting circuit.

4. The counting circuit as described in claim 3, wherein said programmable clock means is programmable for timing rates of 2 MHz, 1 MHz, 500 KHz, or 250 KHz.

5. The high speed counting circuit as described in claim 3 further comprising second programmable clock means for providing timing pulses for reading background neutron events and second scaler means inputted by said decoder means for providing an output indicative of a total number of said background neutron events.

6. The high speed counting circuit as described in claim 5, wherein said first and second scaler means each comprise 32 scalers.

7. The high speed counting circuit as described in claim 1, wherein said shift register means includes a 25 ns access 1024 by 4 random access memory circuit.

8. The high speed counting circuit as described in claim 7 wherein said shift register means is programmable for lengths over a range of 1 to 1024 bins.

9. The high speed counting circuit as described in claim 1, wherein said summing means comprises a programmable read only memory circuit programmed as a summer.

10. The high speed counting circuit as described in claim 1, wherein said synchronizing means comprises a plurality of input circuits one for each of said neutron detection means.

11. A high speed programmable circuit for accurate neutron coincidence counting comprising:
   a plurality of neutron detection means for supplying electrical pulses on detection of neutrons:
   a plurality of digital processing circuits, one digital processing circuit associated with each one of said plurality of neutron detection means, each of said digital processing circuits inputted by its individually associated said neutron detection means for derandomizing and latching said pulses supplied by said neutron detection means;
   a programmable read only memory circuit programmed as a summer inputted by said plurality of digital processing means for summing said pulses received during a predetermined period of time;
   shift register means comprising a random access memory inputted by said programmable read only memory circuit for shifting said sum of added pulses;
   counter means inputted by said programmable read only memory circuit for storing said sum of said pulses;
   serializing means inputted by said shift register means and outputting the contents of said shift register means as a serial stream of pulses for decrementing said sum of said pulses stored in said counter means by one pulse at a time;

decoder means inputted by said counter means after each decrement for producing an output indicative of said sum of pulses stored in said counter means after each decrement.

first scaler means inputted by said decoder means for storing said sum of pulses stored in said counter means after each decrement.

12. The high speed programmable circuit as described in claim 11, wherein said plurality of neutron detection means comprises up to fifteen neutron detectors.

13. The high speed programmable circuit as described in claim 11 wherein said random access memory circuit comprises a 25 ns access 1024 by 4 random access memory circuit.

14. The high speed programmable circuit as described in claim 13 wherein said shift register means is programmable for lengths over a range of 1 to 1024 bins.

15. The high speed programmable circuit as described in claim 11, further comprising first programmable clock means for providing overall timing pulses to said high speed counting circuit.

16. The high speed programmable circuit as described in claim 15 further comprising second programmable clock means for providing timing pulses for reading background neutron events and second scaler means inputted by said decoder means for providing an output indicative of a total number of said background neutron events.

17. The high speed programmable circuit as described in claim 16, wherein said first and second scalers means each comprise 32 scalers.

* * * * *